Sept. 17, 1935.     R. S. WEIMER     2,014,792
EXCAVATING APPARATUS
Filed Feb. 8, 1934     6 Sheets-Sheet 1

Inventor
Raymond S. Weimer
by Maxwell F. Cargill
Attorney.

Fig. 2

Sept. 17, 1935.    R. S. WEIMER    2,014,792
EXCAVATING APPARATUS
Filed Feb. 8, 1934    6 Sheets—Sheet 3

Inventor
Raymond S. Weimer
by Maxwell F. Cargill
Attorney.

Patented Sept. 17, 1935

2,014,792

UNITED STATES PATENT OFFICE 2,014,792

EXCAVATING APPARATUS

Raymond Samuel Weimer, Wilmington, Ill.

Application February 8, 1934, Serial No. 710,223

22 Claims. (Cl. 37—189)

This invention relates to improvements in excavating apparatus.

One object of the invention is to provide excavating apparatus comprising a rotary structure or wheel provided with one or more excavating buckets, each of which during a certain arc of rotation, is manually controllable, while during the remaining arc of rotation and during which the dumping of the buckets takes place, the buckets are controlled automatically.

Another object of the invention is to provide a rotary excavating structure having radially extendible buckets under manual control during an arc of rotation within which the excavating or digging action takes place, and automatic control means for each bucket for effecting the dumping of the contents, as into a hopper, for example, and retracting the buckets after dumping to pass the hopper, whereby the wheel can be operated continuously and the attention of the operator is required only as to the buckets as they move in succession into excavating position.

A further object of the invention is to provide hydraulically or pressure-fluid actuated mechanism for operating the buckets during the period of manual, as well as of automatic control.

The invention is broadly characterized by the provision of a rotary wheel or like structure which carries a plurality of excavating buckets each of which moves during each rotation of the wheel into an arc of manual control wherein the operator can cause the bucket within such arc to be extended or retracted substantially radially of the wheel as may be necessary in taking on the desired load. The loaded buckets are carried in succession to a point where the dumping of the contents is automatically effected, as into a hopper from which the material is conveyed away by suitable conveyors, after which dumping action the buckets again move into the arc of manual control.

A further object is to provide an excavating wheel the buckets of which are provided with pressure fluid actuated pistons for moving the buckets radially of the wheel, the fluid being controlled by valves which in turn are controlled automatically within a certain arc of rotation of the wheel and are manually controllable within another arc of rotation.

Another object of the invention is to provide a rotary structure having pivotally mounted thrust members provided with buckets at the outer ends which are connected to the structure with link members which not only resist the operating stresses on the buckets and thrust members in a circumferential direction but cooperate with the thrust members to effect a peripheral acceleration or deceleration of the respective buckets as the same are moved outwardly or inwardly respectively by the thrust members.

Other objects relate to various features of construction and arrangement of parts which will be apparent from a consideration of the following specification and accompanying drawings, wherein.

In the drawings an embodiment of the invention is shown which is designed for large capacity work such as in removing the over-burden in strip mining.

Figure 1:
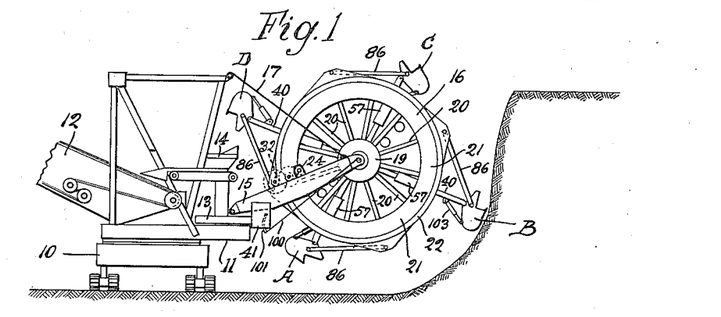
Figure 1 is a broken side elevation of excavating apparatus embodying the present improvements.

In Figure 1 of the drawings there is shown a carriage 10 having mounted thereon a turntable 11 upon which is mounted a conveyor 12 which carries the soil removed by the excavator to a spoil pile, not shown. Also carried by the main turntable 11 is a second turntable 13 which carries a hopper 14 into which the excavator discharges the soil and from which it is discharged into the conveyor which may be an endless conveyor or a conveyor of the car type such as is shown in my Patent Number 1,956,738.

The turntables 11 and 13 are provided with any suitable means for operating the same, such as is disclosed in my above application.

Also mounted on the turntable 13 is a boom indicated generally by the numeral 15. The boom supports the excavating wheel 16. The boom may be raised or lowered by any suitable means such as by means of a power operated cable 17, also more specifically described in the above mentioned application.

Figures 3, 4:
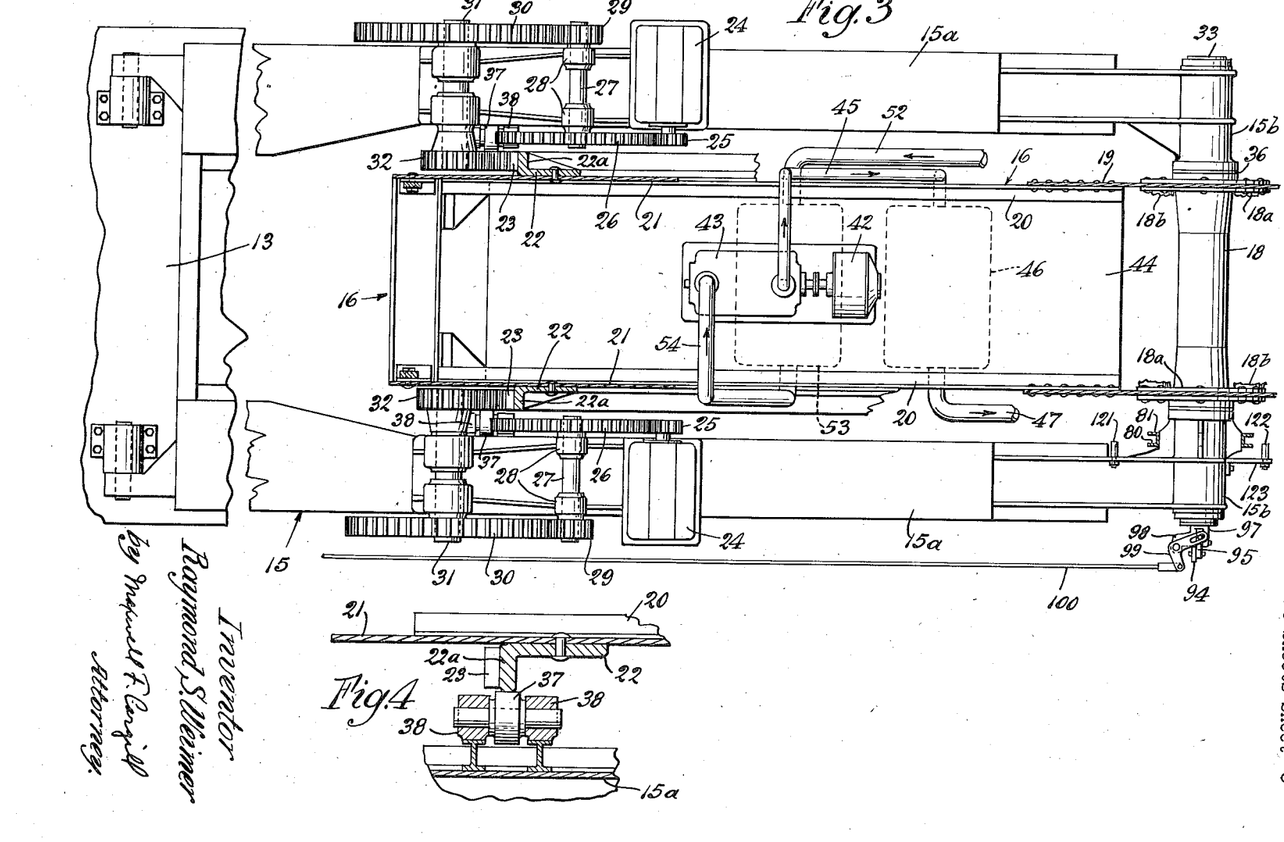
Figure 3 is a broken sectional view taken approximately on line 3—3 of Figure 2.
Figure 4 is a detailed sectional view taken on line 4—4 of Figure 2.

Referring to Figure 3, it will be seen that the boom generally indicated by the numeral 15, has two similar sections 15a. These sections are spaced apart sufficiently to accommodate the excavating wheel 16. The wheel in the form shown is constructed of structural steel and comprises a central hub 18 secured to opposite plates 19 to which are secured the radial ribs or spokes 20. An outer annular plate or rim 21 is secured to the spokes 20, to which member 21 are secured annular members 22 which are provided with teeth 23.

Mounted on each of the boom sections 15a are motors 24, each of which is provided with a driving pinion 25 which drives the gears 26 carried by the shaft 27 mounted on bearings 28 carried by the boom sections.

The shafts 27 carry pinions 29 which in turn drive the gears 30 carried by the shafts 31.

The shafts 31 are provided with driving pinions 32 which mesh with the teeth 23 of the annular members 22, for rotating the wheel 16.

The hub member 18 of the wheel is mounted on the stationary shaft 33 carried by the ends of the boom members 15a.

Figure 6:
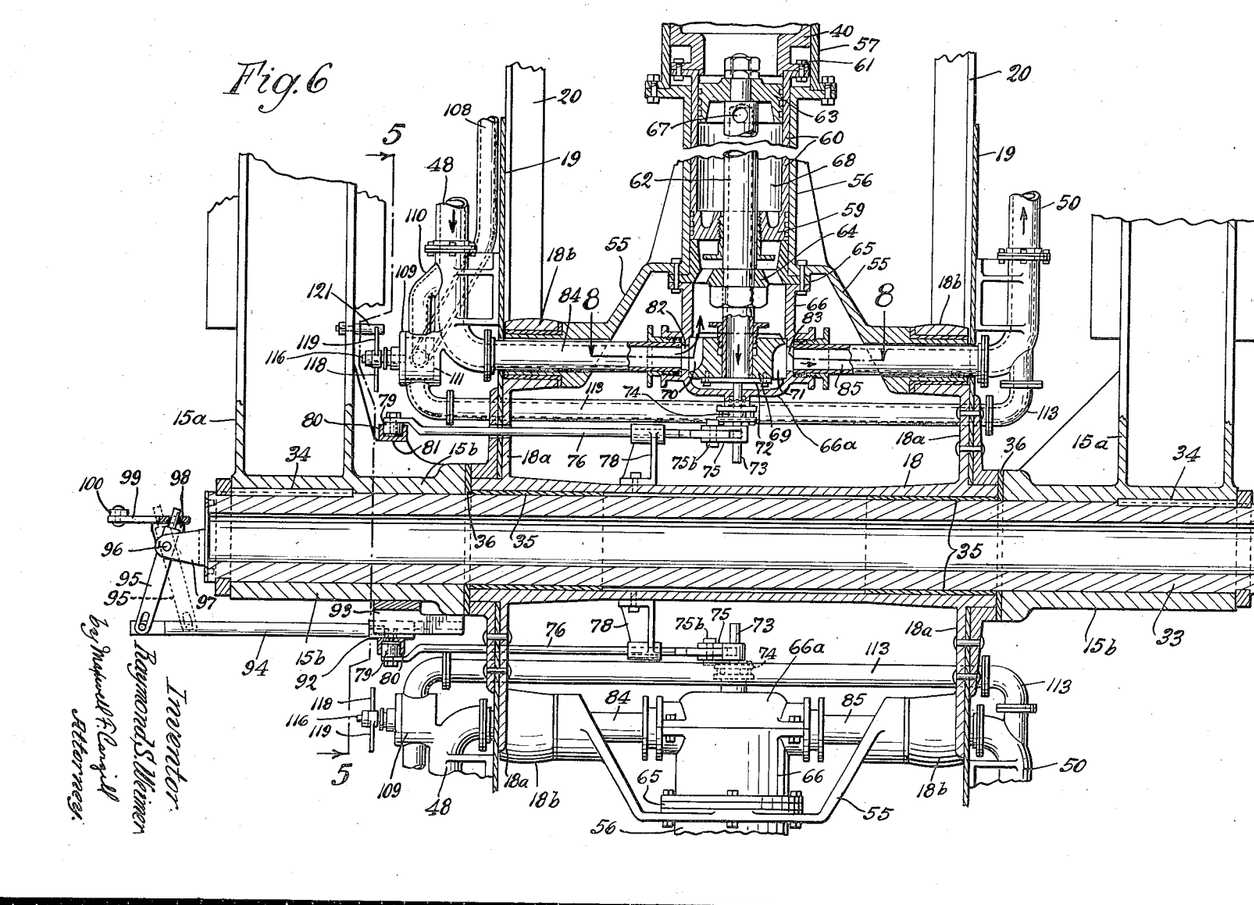
Figure 6 is a section taken approximately on line 6—6 of Figure 5.

The shaft 33 is shown in Figure 6 as being keyed at 34 to the boom members 15a, which at their ends are provided with housings 15b for supporting the shaft. Also in said figure, bearings 35 are shown disposed between the hub 18 and the shaft 33, and additional bearings 36 between the ends of the hub and the adjacent ends of the housings 15b.

Figure 2:
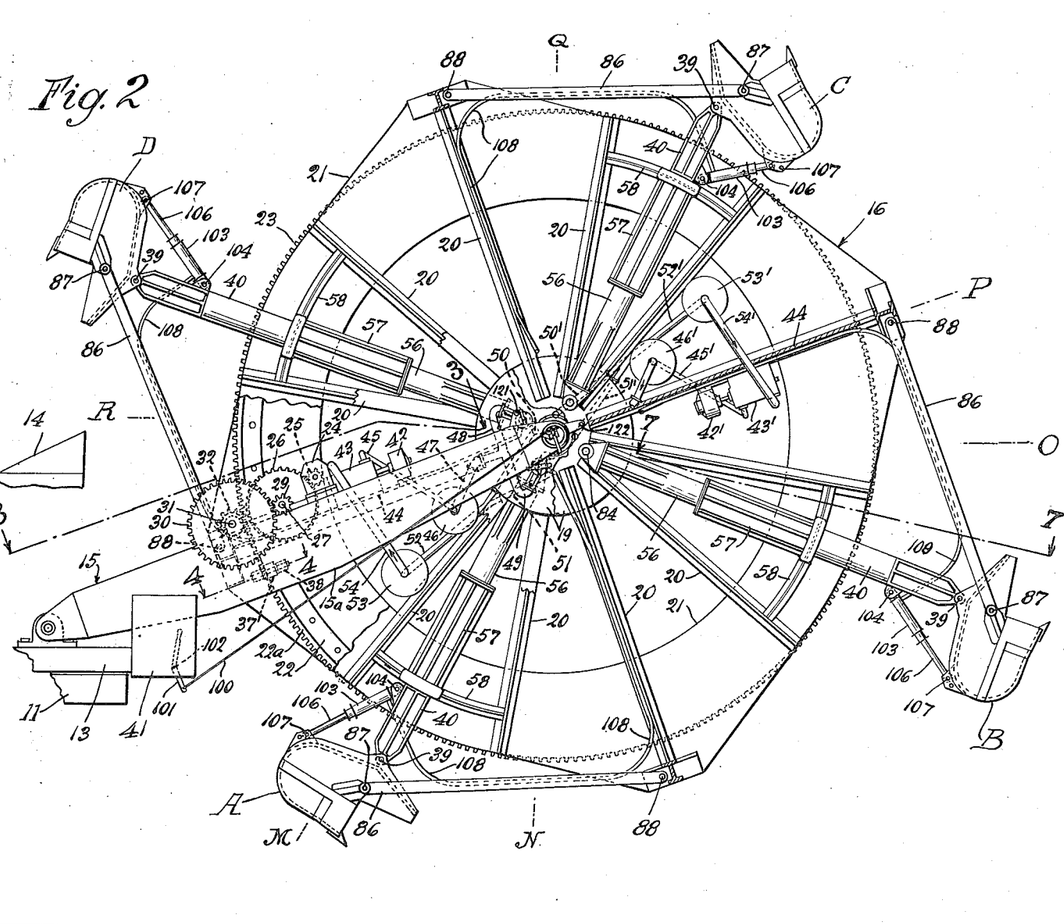
Figure 2 is an enlarged broken side elevation of the rotary excavating mechanism.

When the motors 24 operate they will through the mechanism above described, effect the rotation of the wheel in counter-clockwise direction, as viewed in Figures 1 and 2.

In Figure 4 a roller 37 is shown mounted in bearings 38 carried by the boom members 15a which rollers bear against the upwardly turned flanges 22a of the members 22 to prevent side sway of the wheel, and thus hold the teeth 23 in engagement with the pinions 32. The position of the rollers in side elevation is shown also in Figure 2.

As shown in Figures 1 and 2, the wheel 16 is provided with a plurality of excavating buckets A, B, C and D. Each of the buckets is pivotally mounted at 39 to a thrust member 40 which can be moved substantially radially inwardly or outwardly by mechanism hereinafter described during the rotation of the wheel.

Referring to Figure 2 it will be seen that bucket A has just entered excavating position, and that bucket B is approaching the limit of excavating position. Bucket C has been retracted inwardly toward the periphery of the wheel and has been rotated upon its pivot 39 in a clockwise direction so as to retain the contents thereof against spilling. Bucket D is shown in extended position and tilted counter-clockwise from the position shown at C so as to discharge its contents into the hopper shown fragmentarily at 14.

Immediately after the discharge of the contents into the hopper, the bucket D will be retracted so as to pass the hopper and move in such retracted or semi-retracted position into the excavating arc. The arc of rotation represented by the movement of any bucket from the position of bucket A to bucket B is the arc during which excavation takes place. As each bucket passes into said arc, it comes within the control of an operator located in the station 41, which may be carried by the turntable 13 or positioned at any other convenient place on the superstructure of the carriage 10.

Each bucket in passing from the position of bucket B around to the position of bucket A is automatically controlled, whereby the operator need pay no attention to the dumping of the buckets, but can give his entire attention to each bucket as it passes into and through the arc of excavation.

In the embodiment of the invention herein shown, the movement of the buckets radially while under automatic or manual control is effected by pressure fluid. In Figure 2 there is shown a motor 42 which operates a fluid compressor 43 which members are carried by a transverse shelf 44 extending between a pair of opposite ribs or spokes 20, as shown in Figure 3. The compressor 43 delivers fluid through pipe 45 to a high pressure tank 46 also attached by any suitable means to the wheel structure. The fluid passes from the high pressure tank 46 through a conduit 47 to branch conduits 48 and 49, each of which delivers fluid under pressure to a cylinder having therein a double acting piston which operates the thrust member 40 inwardly or outwardly under either automatic or manual control.

Exhaust fluid from the piston, which will be described later, returns through branch conduits 50 and 51 which connect with the return pipe 52, which delivers the fluid to a low pressure tank 53. From the low pressure tank the compressor 43 draws the fluid through the pipe 54 and compresses the same and discharges it through the pipe 45 into the high pressure tank 46.

The fluid compressing, delivery and return system just described, serves the operating pistons of the buckets D and A. Diametrically opposite of the wheel is another fluid compressing, delivery and return system, which is identical with that just described, but which serves operating pistons of the buckets B and C. The corresponding elements of the latter system are given corresponding primed designating numerals.

Referring to Figure 6 it will be seen that the hub 18 of the wheel is provided with radial flanges 18a which are provided with bearings 18b in which are journaled the arms 55 of the cylinder 56. As there are four buckets shown, there will be, of course, four similar cylinders, the description of one of which will suffice.

Figures 7, 12, 13, 14:
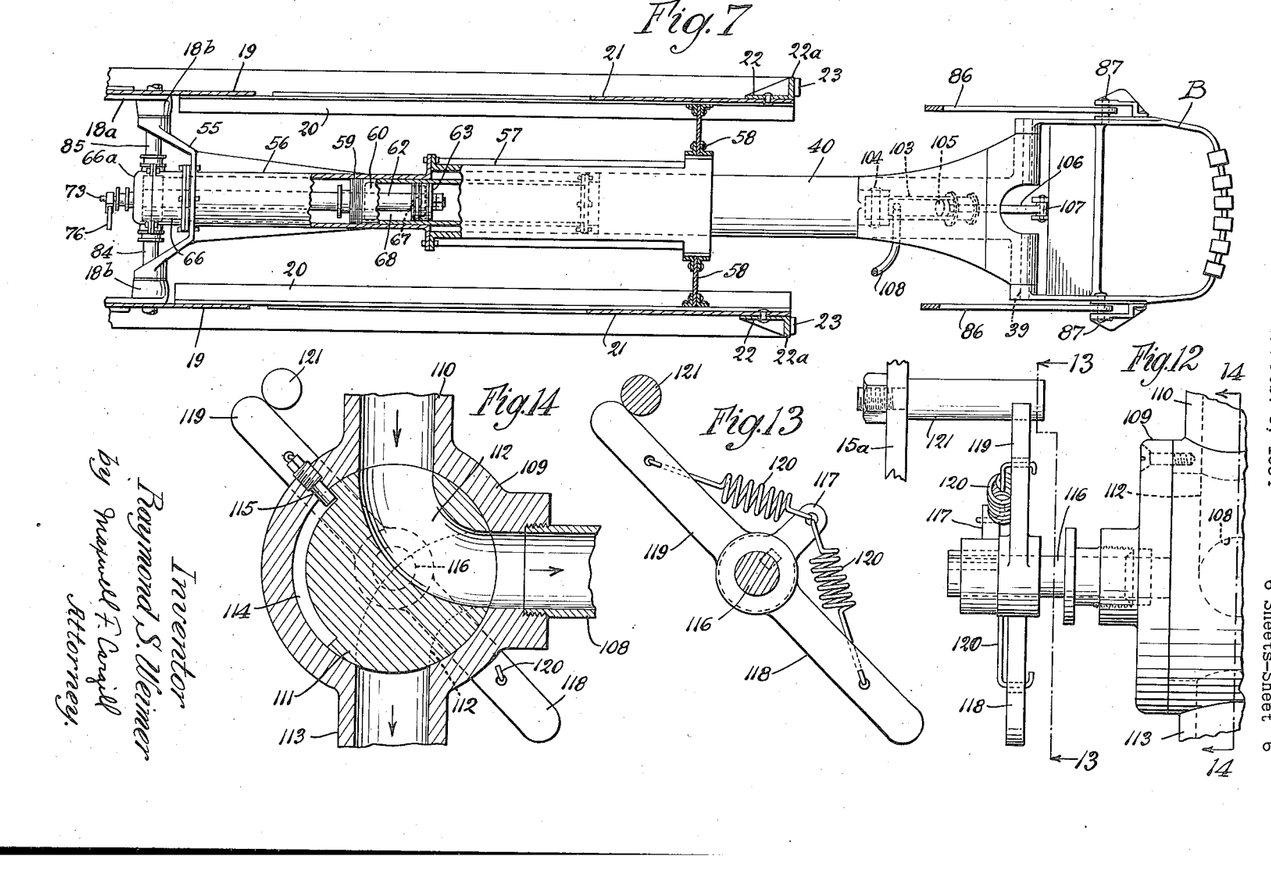
Figure 7 is an enlarged sectional view, with parts broken away, taken along line 7—7 of Figure 2.
Figure 12 is a broken elevation of a valve which controls the piston which effects the tilting of a bucket.
Figure 13 is a sectional view taken on line 13—13 of Figure 12.
Figure 14 is a sectional view through the valve taken on line 14—14 of Figure 12.

The outer end of each cylinder 56 is connected to a guiding tube 57 which at its outer end, as shown in Figures 2 and 7 is supported by opposite guides 58 extending between two adjacent spokes 20 of the wheel. The guides 58 permit the cylinder construction to pivot within the bearings 18b within a central plane of the wheel, but prevent lateral movement of the cylinder structure.

Within the cylinder 56 is a piston 59 having a tubular extension 60 which projects into the guiding sleeve 57, and is there secured as by bolts 61 to the thrust member 40.

The piston head 59 is centrally apertured and slides on a tube 62 which at its outer end is supported by a piston closure member 63, and adjacent its inner end by a spider-like member 64 having an outwardly turned flange 65 disposed between the end of the piston 56 and a valve casing 66. The outer end of the tube 62 is provided with openings 67 which permit pressure fluid to flow from the tube into the chamber 68 and thus act against the inside of the piston head 59, or to permit fluid within the chamber 68 to flow into the tube 62 when the piston head is moved toward the closure member 63 as viewed in Figure 6.

Figures 8, 9, 10, 11:
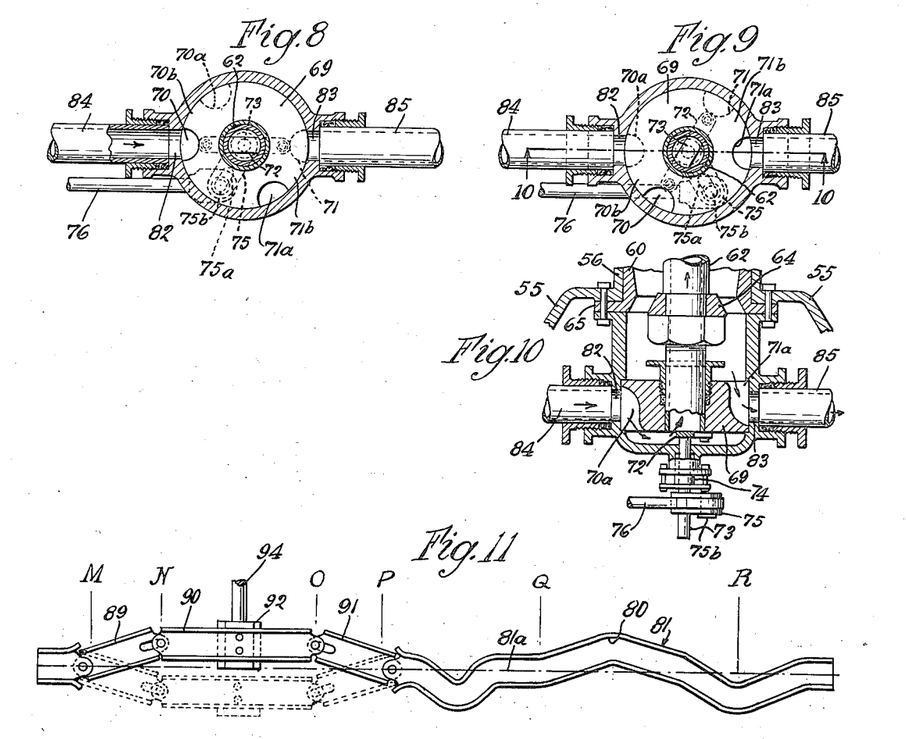
Figure 8 is a sectional view of one of the piston control valves taken on line 8—8 of Figure 6.
Figure 9 is a similar sectional view but showing the valve in another position.
Figure 10 is a sectional view of the valve taken on line 10—10 of Figure 9.
Figure 11 is a development of the cam by means of which the piston control valves shown in Figures 8, 9 and 10 are operated.

On the inner end of the tube 62 is movably mounted a valve 69 of disc-like form, and having formed in the margins thereof two groups of ports 70 and 70a, and 71 and 71a, respectively, (see Figures 8 and 9).

The valve 69, as shown in Figure 6, is provided with a transverse member 72 which does not close the end of the tube 62 and from which member 72 extends an axial shaft 73. The shaft extends through the cover 66a of the valve casing 66, and is provided with a packing gland 74 to prevent leakage of fluid round the shaft.

The shaft is provided with a crank arm 75 to which is pivoted an operating rod 76 which is supported by a bracket 78 secured to the hub 18, and carries a roller 79 at its outer end. The roller is positioned in a cam trackway 80 of a cam 81 which is secured to the stationary portion 15b of the boom arm 15a. The cam is arranged to effect horizontal movement of the arm 76 as will be described more specifically hereinafter, to effect the movement of the shaft 73 and the oscillation of the valve 69, so as to move either opening 70 or 71 into registration with the fluid inlet port 82 and likewise to move either exhaust port 71 or 71a into registration with the fluid exhaust port 83.

As shown in Figure 6, pressure fluid from pipe 48 flows into the pipe 84 to the intake port 82, said pipe being positioned coaxially with reference to the pivoted arms 55 of the piston structure. Thus in the position shown in Figure 6, pressure fluid can pass through the inlet port 82 and will be directed by the valve port 70 into the casing 66, and into the cylinder 56 to force the piston 59 outwardly or vertically, as shown in Figure 6. The movement of the piston outwardly forces the thrust member 40 outwardly to which the respective bucket is secured.

During the outward movement of the piston 59, as just described, any exhaust fluid within the chamber 68 will be forced through the openings 67 of the tube 62, and pass through the tube and thence through the outlet port 83 into the pipe 85 which is also coaxially mounted with respect to the pivoted ends of the arm 55. The fluid passing through the pipe 85 enters the branch exhaust pipe 50, from which it flows to the pipe 52, (see Figure 2) back into the low pressure reservoir 53.

If the valve operating rod 76 is moved to the right, as viewed in Figure 6, by the cam, the valve 69 will occupy the position shown in Figure 10. This pressure fluid will enter the pipe 84 through the valve port 70a, and will enter the inner end of the tube 62 and will flow through the openings 67 into the chamber 68 and exert pressure in a direction to move the piston 59 toward the position it occupies in Figure 6.

Thus, when the valve 69 is in the position shown in Figure 10, the pressure fluid will effect the movement of the respective bucket inwardly toward the periphery of the wheel. When the piston is moving toward the position shown in Figure 6, the previous charge of fluid will be exhausted through the valve port 71a (see Figure 10) into the pipe 85, and thence into branch pipe 50 which, as before stated, communicates with the main return pipe 52, which conveys the exhaust fluid to the low pressure reservoir 53.

As shown in Figures 1 and 2, a pair of tension arms 86 is pivotally attached at 87 to each bucket and also at 88 to a portion of the wheel 16. These tension arms carry the stresses exerted circumferentially on the bucket during the cycle of operation. These arms 86 will cause a slight pivotal movement of the bucket and cylinder structures about the journaled ends of the arms 55 when the pistons move inwardly or outwardly. Such pivotal movement will, of course, tend to swing the valve shaft 73 slightly, but such movement with reference to the rod 76 is accommodated by the provision of a slot 75a in the arms 75 through which the pivot pin 75b passes, (see Figures 8 and 9).

The cam 81 which operates the rods 76 is shown in section in Figure 6. In this figure, two of the rods 76 are also shown but it will be understood that similar rods are provided for the other two cylinder mechanisms which are not shown in said figure. The relative positions of the rods 76 are, however, shown in Figure 5.

A development of the cam 81 is shown in Figure 11. It will be seen that the track or channel 80 of the cam has portions thereof offset from the central line of the track indicated by the broken line 81a. As the respective rollers 79 move along the channel 80 during the rotation of the wheel 16, the channel will effect the longitudinal movement of the rods 76, and thus effect the shifting of the valves as above described.

The sections of the channel not offset from the center line 81a will hold the valves in closed position, that is, in the position where the portions 70b and 71b register respectively with the inlet and outlet ports 70 and 83. Thus when a roller 79 is traveling along a central section of the cam track, no outward or inward movement of the respective piston will take place. The cam is provided with a laterally adjustable section comprising members 89, 90 and 91. The central section 90 is carried by a slide 92 which is carried by the supporting guide 93 (see Figure 5) which is attached to the hub 18 of the wheel 16.

Secured to the slide 92 is an operating rod 94 which extends laterally of the wheel as shown in Figure 6, and at its outer end is connected to a lever 95 which is pivoted at 96 to a bracket 97 secured to an end of the stationary shaft 33. The bracket 97 has an offset arm 98 on which is pivoted another lever 99 having an opening in one end through which the upper end of the lever 95 extends. The opposite end of the lever 99 is pivoted to an operating rod 100 (see Figure 2) which extends to the operator station 41, and is there connected to a manually operable lever 101, the latter being pivoted at 102 to any suitable support in or adjacent the station.

By moving the upper end of the lever 101 to the right as viewed in Figure 2, the rod 100 will be retracted. This movement will swing the lever 99 in a direction to operate the lever 95 in counter-clockwise direction, and move the cam shift rod 94 to the right as viewed in Figure 6. The movement of the rod 94 effects the shifting movement of the adjustable cam section. As shown in Figure 11 the adjustable cam section can be moved to the full line position, or to the dotted line position. It may, of course, be moved to any intermediate position.

The rollers 79 carried by the arms 76 in passing along the channel 80 of the cam, effect the shifting of the respective valves 69 as above described. Referring to Figure 11, the rollers 79 move from left to right. As a roller moves into the adjustable section of the cam, its path of travel can be controlled by sliding the section 92 within the member 93. This lateral movement of the roller effects the adjustment of the respective valve 76, so that the piston controlled by such valve will be moved outwardly or inwardly, or held in a stationary relation with reference to the wheel.

Thus, if a roller travels along the adjustable section shown in full lines in Figure 11, the rod 76 carried by such roller will be shifted from the position shown in Figure 10 to the position shown in Figure 6, and pressure fluid will enter the cylinder to force the piston outwardly, and thus move the respective bucket outwardly. Should the adjustable section be moved in alignment with the center line 81a, the valve will be retained in intermediate position with the result that the bucket will be moved neither outwardly nor inwardly. If the adjustable section of the cam is moved to the dotted line position of Figure 11, the valve 69, operable by a roller 79 passing through such adjustable section, will be moved to the position shown in Figure 10, whereby pressure fluid will be delivered to the piston through the tube 62 and move the piston inwardly or in a direction to retract the respective bucket.

The adjustable section of the cam comprises about 130° of the arc of rotation of the wheel, but it will be seen that full manual control of a bucket can be effected only while the respective roller 79 is traveling along the section 90. When any roller is within such section, the valve controlled thereby can be reversed so as to change the direction of flow of pressure fluid to the respective piston to move it from one extreme position to the other.

This arc of complete manual control is approximately 90°. As the roller passes from the arc of manual control, the valve controlled thereby is closed, but in moving farther to the right the roller travels into the adjacent curved portion of the track which shifts the valve to the position shown in Figure 10, whereby the piston and its respective bucket are fully retracted.

Further movement of the roller to the right carries it into an oppositely offset portion of the track, which moves the respective valve 69 to the position shown in Figure 6, which causes the respective bucket to be moved to extended position, while continued travel of the roller to the right, as viewed in Figure 11, causes it to be shifted again laterally in the direction to retract the respective bucket. The roller then travels to the next portion of the cam track, which is disposed centrally of the cam, in which position the respective valve is closed, that is, with the portion 70b (see Figure 8) disposed over the inlet port 82. The roller next moves into the arc of manual control.

Referring to Figure 11, the points M and P indicate the limits of the arc of manual control, while points N and O indicate the limits of the maximum manual control. These marks are correlated approximately with correspondingly designated marks in Figure 2, wherein it will be seen that the bucket A is just entering the arc of manual control. From point N to O in Figure 6, that is, through an arc of approximately 90°, a bucket therein can be fully extended or fully retracted at the will of the operator in manipulating the bucket to fill the same. The bucket B is shown within this arc.

As the bucket passes point P it is controlled by that portion of the cam between points P and Q, in Figure 11. Thus the roller 79 of a bucket passing beyond point P of Figure 2 will be retracted to the position of bucket C in said figure. As a bucket moves past point Q of Figure 2, its respective roller will be moved laterally by the arc of the cam of Figure 11, lying between points Q and R. This portion of the cam will shift the roller, and consequently the corresponding valve 69 to the position shown in Figure 6, whereas pressure fluid will enter the cylinder 56 and force the piston 59 outwardly to carry the bucket to the fully extended position of bucket D (see Fig. 2). The bucket will thus be moved outwardly so that the contents, when dumped, will fall into the hopper 14. Continued rotation of the bucket from the position of bucket D in Figure 2, will cause the respective roller thereof to be shifted to the opposite direction to retract the bucket to enable it to pass the hopper. The roller 79 of the bucket is then guided by the neutral section of the cam track, which leads it again to the section of manual control.

From the above it will be seen that the operator, by shifting the lever 101, can control each bucket as it moves into the excavating arc, that is, from approximately point M to point P of Figure 2. During the remaining arc of rotation of each bucket it is automatically controlled by the stationary portion of the cam to first retract it as indicated by bucket C, whereby the effective load on the driving mechanism is reduced.

During the next designated arc, that is, from point Q to point R, the bucket is first extended to dumping position and then immediately retracted, in which position it continues until it again reaches the arc of manual control.

Referring again to Figure 2 it will be seen that bucket C has moved clockwise about the pivot 39 from the position occupied by the remaining buckets. This movement is desirable as the buckets move beyond point P to prevent the spilling of a portion of the load carried by the buckets as they move out of the arc of manual control. As the bucket C moves to the dumping position occupied by bucket D, it is desirable to rotate the bucket on its pivot 39 counter-clockwise to insure that the bucket will discharge its entire load.

For effecting the movement of each bucket upon its pivot 39, each bucket is provided with a cylinder 103 which is pivoted at 104 to the respective thrust member 40. In each cylinder 103, as shown in Figure 7, is a single acting piston 105 having a rod 106 which is pivoted at 107 to a rear portion of the bucket. Each cylinder is connected by a flexible tube 108 with a valve casing 109 (see Figures 6, 12, 13 and 14).

Extending to the casing 109 from the pressure fluid pipe 48 is a branch pipe 110 which carries pressure fluid to the valve casing 109. Within the casing 109 is a three-way valve 111 provided with a passage 112 by means of which fluid entering the valve from pipe 110 is directed to the tube 108 for conveyance to the cylinder 103, for moving the piston 105 outwardly to move the bucket from the position of bucket C (see Figure 2) to the position of bucket D with respect to its thrust member 40. If the valve member 111 should be rotated 90° in a clockwise direction from the position shown in Figure 14, the passage 112 will establish communication between pipe 108 and pipe 113 (which, as shown in Figure 6, extends transversely of the wheel) and into communication with the exhaust or return pipe 50 through which the exhaust fluid is conveyed to the respective low pressure tank 53 or 53'.

When the valve 111 has been rotated as just described, the entrance of pressure fluid into the valve will, of course, be cut off. The valve member 111 is shown provided with an arcuate groove 114 into which projects a stud 115 which limits the movement of the valve as will be clear.

The valve member 111 is provided with an operating shaft 116 which extends exteriorly of the valve casing 109 as shown in Figure 12, and has keyed thereto an operating arm 117.

Also mounted on the shaft 116 is an integral pair of arms 118 and 119 which are movable upon the shaft. Springs 120 connect the arms 118 and 119 to the valve operating arm 117. A pin 121 (see Figures 6, 12, 13 and 14) is carried by the boom member 15a so as to project into the path of rotation of the arm 119. The position of the pin 121 (see Figures 2, 5 and 6) is such that as each bucket approaches the position of bucket D in Figure 2, the arm 119 of the respective valve mechanism will engage the pin 121 and effect the rotation of the respective valve 111 to the position shown in Figure 14. In this position of the valve as above explained, pressure fluid will be directed from pipe 48 through pipe 110 through the valve passage 112, and thence into the flexible tube 108 to the cylinder 103 to force the piston 105 outwardly.

The spring 120 permits the arm 119 to snap past the pin 121 as the wheel continues its rotation, while the stop pin 115 limits the movement of the valve member 111 so that the passage 112 will always register either with pipes 108 and 110 or 108 and 113.

Figure 5:
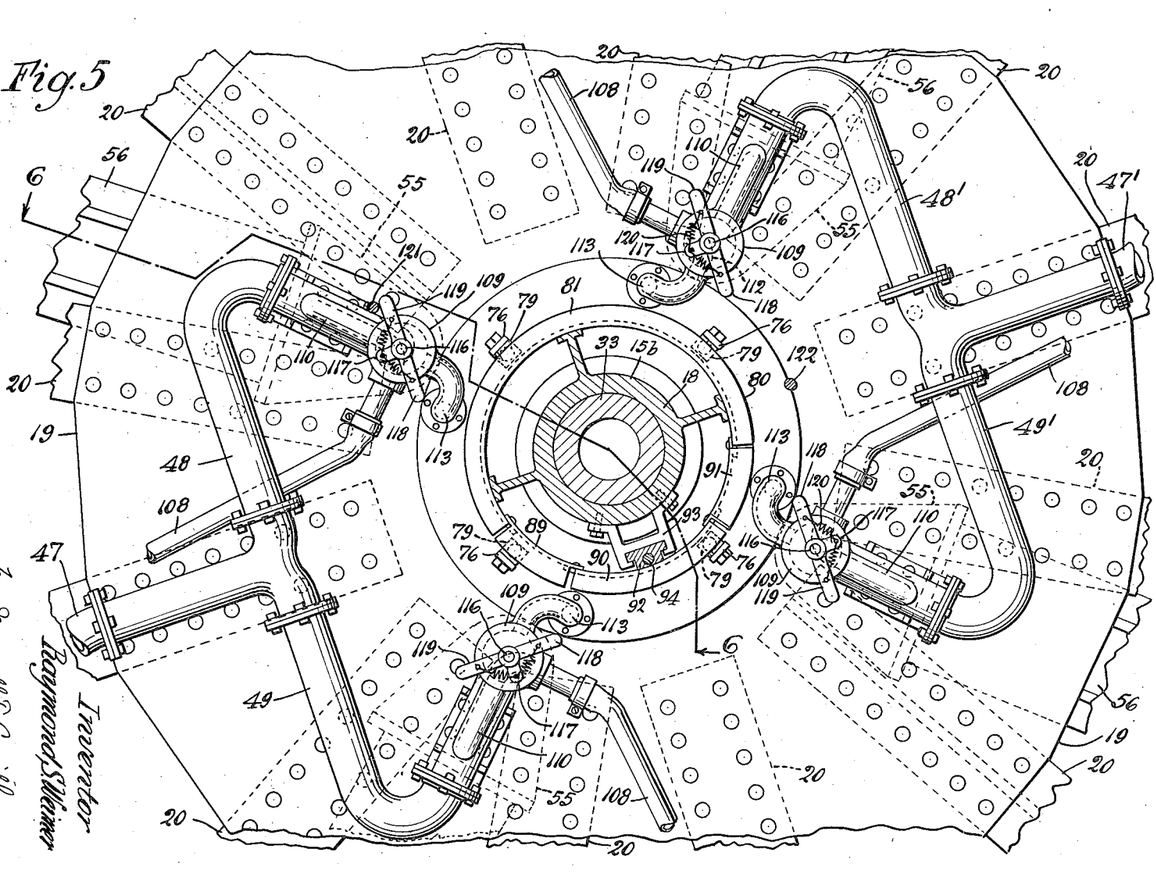
Figure 5 is a section taken along line 5—5 of Figure 6.

A second pin 122 which, as shown in Figure 3, may be carried on a bracket 123 secured to a stationary portion of the boom structure, projects into the path of rotation of the arm 118. The location of this pin 122 is shown in Figure 5, and is so positioned that it will engage the arm 118 of each of the respective valve mechanisms as the respective bucket moves out of the arc of manual control.

Thus the pin 122, by shifting the valve 111 clockwise through an arc of 90° from the position shown in Figure 14, places the pipe 108 in communication with the exhaust pipe 113, whereby the pressure fluid in the respective cylinder 103 can exhaust through pipe 108, passage 112, pipe 113, and into the exhaust pipe 50.

The load in the bucket will thus cause the bucket to recede or move clockwise about the pivot 39 to the position of bucket C of Figure 2, which will prevent the contents from spilling readily therefrom.

From the above description it will be seen that each bucket is provided with a double acting piston for moving the same outwardly or inwardly in a substantially radial direction, and that the flow of pressure fluid to each piston to effect the movement in the desired direction is controlled by a separate valve 69, which is shiftable by means of a rod 76 carrying a roller 79 which moves within the cam channel 80. As above explained also while any one of the said rollers is moving through the cam members, 89, 90 and 91, the respective bucket is under manual control, while during the remainder of the cycle of each roller through the cam channel, the movement of the respective bucket is controlled automatically. The movement of each bucket upon its respective pivot 39 is controlled by a separate valve 111 which is shifted from one position to another by the pins 121 and 122, the former pin causing the valve to move to the position shown in full lines in Figure 14, whereby the bucket is moved counterclockwise upon its pivot to dumping position, while the latter pin 122 moves each valve 111 to the position wherein the channel occupies the dotted line position, and permits the fluid in the respective cylinder 103 to be discharged, whereby the bucket will move by gravity to the position of bucket C in Figure 2.

Current for operating the compressor motors 42 and 42' may be supplied by any desirable means such as by the use of slip rings, not shown, mounted concentrically of the shaft 33.

From the above it will be seen that I have provided excavating apparatus comprising a plurality of buckets carried by a rotary structure in the form of a wheel, each of which buckets moves in succession into an arc within which it may be controlled manually by an operator, and that during the remainder of the cycle of each bucket it is controlled automatically, whereby the operator needs pay attention to the buckets as they move through the arc of manual control only. It will be obvious that the rotary structure need not be provided with four buckets as above described, but that one or any feasible number of buckets may be employed.

It will also be observed that as each bucket is dumped and retracted to clear the hopper during the continuous rotation of the structure, the links 86 are moved about their pivotal points 88 and hence cause the extensible thrust members 40 to move about their respective pivots 84 in a direction opposite the direction of movement of the structure as a whole. This arrangement of the pivoted links and pivoted thrust or extensible members thus momentarily retards the rotary or peripheral movement of the buckets and hence provides additional time for inward movement of the buckets to clear the hopper 14. During the movement of the buckets outwardly by the thrust members 40, the opposite action takes place, that is, the peripheral speed of the buckets is accelerated. Referring to Figure 2, it will be seen that as a bucket is being thrust outwardly to the dumping position of bucket D, its peripheral movement will be increased slightly over the peripheral speed of the rotary structure as a whole and as the bucket reaches the maximum extended position of bucket D it is decelerated to the speed of the structure with the result that the contents of the bucket are more readily discharged.

While I have shown and described an embodiment of my improvements for the purpose of illustration, I do not wish to be restricted specifically thereto except as so limited by the appended claims.

I claim:

1. Excavating mechanism comprising a rotatable wheel, means for supporting the same, means for rotating said wheel, one or more radially movable buckets carried by said wheel, and pressure fluid actuating means on said wheel for moving said bucket or buckets radially.

2. Excavating mechanism comprising a rotatable wheel, means for supporting the same, means for rotating said wheel, a plurality of radially movable buckets carried by said wheel, pressure fluid actuating means for moving said buckets radially, and means for controlling the operation of said actuating means.

3. Excavating apparatus comprising a rotatable wheel, means for supporting same, means for rotating said wheel, a plurality of radially movable buckets pivotally carried by said wheel, a fluid actuated piston for each bucket for moving the same radially, a second fluid actuated piston for each bucket for moving the same pivotally, and means for controlling the predetermined actuation of said pistons within certain arcs of rotation of said wheel.

4. Excavating apparatus comprising a boom, a rotatable wheel supported thereby, means for rotating said wheel, pressure fluid supply means carried by said wheel, a plurality of excavating buckets carried by said wheel, pressure fluid actuated means for each bucket communicating with said supply means and arranged to move said buckets radially of the wheel, and means for controlling the flow of pressure fluid to each of said actuated means for moving said buckets to predetermined positions during certain arcs of rotation of said wheel.

5. Excavating apparatus comprising a rotatable wheel, means for supporting said wheel in excavating position, a plurality of radially movable buckets carried by said wheel, actuating means for each of said buckets for moving the same radially, control mechanism for said actuating means for effecting the movement of said buckets to predetermined radial positions within certain arcs of rotation of said wheel, and manually operable means for controlling said actuating means within another arc of rotation of said wheel.

6. Excavating apparatus comprising a rotatable wheel, means for supporting said wheel in excavating position, a plurality of pressure fluid actuatable pistons carried by said wheel, an excavating bucket carried by each piston and movable thereby radially outwardly and inwardly of said wheel, a source of pressure fluid carried by said wheel for the actuation of said pistons, a valve for each piston for controlling the flow of fluid thereto, and a cam operatively connected with each valve for regulating the flow of fluid to said pistons for effecting the movement of said buckets to predetermined radial positions within certain arcs of rotation of said wheel, said cam having a manually adjustable portion whereby the movements of said buckets are manually controllable within another arc of rotation of said wheel.

7. Excavating apparatus comprising a rotatable wheel, means for supporting the same in excavating position, a plurality of power operated members carried by said wheel, an excavating bucket pivotally attached to each of said members and movable thereby substantially radially of said wheel, manual means arranged to control said power operated members when the respective buckets are in excavating position, means for automatically controlling said power members as said buckets move from the excavating to the dumping positions, and means for each bucket arranged to tilt the same about the pivots thereof when the respective buckets are in dumping position.

8. Excavating apparatus comprising a rotatable wheel, a boom for supporting the same in excavating position, driving means on said boom for rotating said wheel, pressure fluid holding means carried by said wheel, a plurality of radially movable pressure fluid actuated piston members carried by said wheel, conduits for conveying fluid from said holding means to said pistons for operating the same, an excavating bucket secured to the outer end of each of said piston members and radially movable inwardly and outwardly, a valve for each piston member for controlling the flow of pressure fluid thereto, means for manually operating said valves for successively controlling the radial movement of each of said buckets within a given arc of rotation thereof, and automatic means for controlling said valves during the remaining arc of rotation thereof.

9. Excavating apparatus comprising a rotatable wheel, means for supporting the same in excavating position, a plurality of double-acting fluid pressure actuated piston members carried by said wheel, an excavating bucket pivotally secured to each of said members for pivotal movement with respect thereto and for movement thereby toward and from the periphery of said wheel, valves for directing the flow of fluid to said piston members for effecting the operation of the same in directions to move the respective buckets toward and from said wheel, operating means for said valves comprising a cam having a section arranged to automatically control said valves during a certain arc of rotation of said buckets and comprising also a manually adjustable section, manually operable means for said adjustable section whereby said buckets are movable inwardly or outwardly by the respective pistons during another arc of rotation thereof, a second fluid actuated piston for each bucket arranged to move the same pivotally to effect the dumping of the contents thereof, an automatically operated valve for each of said second pistons arranged to control continuously the actuation of said second pistons, and a source of pressure fluid communicating with said valves.

10. Excavating apparatus comprising a mobile carriage, a pair of spaced boom members carried thereby, a rotatable wheel disposed between and carried by said boom members, means carried by said boom members for rotating said wheel, fluid holding and compressing means carried by said wheel, a plurality of radially disposed pressure fluid operable pistons secured to said wheel, a bucket secured to each piston and movable thereby radially of said wheel during rotation of the latter, conduits for conveying pressure fluid from said holding means to each of said pistons for actuating the same, a valve for each of said pistons for controlling the passage of fluid thereto, and means for operating said valves.

11. Excavating apparatus comprising a mobile carriage having a hopper, a boom carried by said carriage, a rotatable wheel supported by said boom, means for rotating said wheel, a plurality of radially movable buckets carried by said wheel, power means for moving said buckets radially during rotation of said wheel, means for controlling said power means manually within a certain arc of rotation of said wheel whereby the successive buckets can be moved outwardly or inwardly during the excavating operation, and automatic means for controlling said power means during the remaining arc of rotation of the wheel whereby said buckets are moved outwardly in succession by the respective power means to dumping position above said hopper and then retracted to pass said hopper during the continuous rotation of said wheel.

12. Excavating apparatus comprising a rotary wheel, means for rotating the same, a plurality of radially movable buckets carried by said wheel, fluid actuated members for moving said buckets radially, an adjustable valve for each of said members for controlling the flow of actuating fluid to and from the same, an operating member for each of said valves, and a cam having a stationary portion arranged to engage said valve operating members to effect the actuation of said valves to predetermined positions within a certain arc of rotation of said wheel for automatically controlling the radial movement of the buckets moving within said arc, said cam having a manually movable portion arranged to engage said valve operating members successively as the respective buckets move within the remaining arc of rotation thereof.

13. Excavating apparatus comprising a rotary structure, a plurality of radially movable buckets carried thereby, power actuated mechanism for each of said buckets for moving the same radially, means for automatically controlling each of said mechanisms within a certain arc of rotation for regulating the movements of the buckets within said arc, and manually adjustable means for regulating said mechanisms as the respective buckets move in succession into and through the remaining arc of rotation thereof.

14. Excavating apparatus comprising a pair of spaced apart boom members, a rotary excavating structure carried thereby comprising a plurality of double-acting pressure-fluid operable piston mechanisms, a bucket pivotally secured to each mechanism and movable thereby toward and from the periphery of said structure, a source of fluid under pressure for actuating the pistons of said mechanisms, a valve for controlling the admission of fluid thereto for moving said pistons in either direction, means comprising a cam for automatically actuating said valves during an arc of rotation of said buckets for effecting predetermined outward and inward movement thereof, said cam having a movable section, manually operable means for moving said section for effecting the outward or inward movement of said buckets within a predetermined arc of rotation of the same, a second fluid operable piston for each bucket operatively connected thereto for effecting the tilting of the same about the pivots thereof, a valve for each of said second pistons for controlling the flow of pressure fluid to and from the same, and means arranged to operate said valves automatically to effect the tilting of said buckets at predetermined position within the remaining arc of rotation thereof.

15. Excavating apparatus comprising a rotary structure, a plurality of radially disposed double-acting pressure-fluid actuated piston mechanisms carried thereby, a source of pressure fluid for said pistons, a valve arranged to control the flow of fluid to each of said pistons for effecting the movement thereof in either direction, a bucket pivotally secured to each mechanism and movable by said mechanism outwardly or inwardly with respect to said structure, a cam, means operable by said cam for actuating said valves for effecting the automatic outward movement of said buckets at a predetermined position within a given arc of rotation thereof, a second fluid actuatable piston operatively connected to each of said buckets for tilting the same with respect to said respective piston mechanism, a valve for controlling the flow of fluid to each of said second pistons, means controlling said valves to effect the tilting of said buckets in a direction to discharge the contents thereof as said buckets are moved outwardly automatically at said predetermined position, and manually operable means for controlling the outward and inward movement of said buckets as the same move successively through the remaining arc of rotation thereof.

16. Excavating apparatus comprising a rotary structure provided with a plurality of bucket-carrying members carried thereby and arranged for movement inwardly and outwardly with respect to said structure, a bucket carried by each of said members, power means for actuating said members, automatic means for controlling said power means to effect the disposition of said buckets at predetermined positions relatively to said structure while said buckets are moving within a given arc of rotation, and manually operable means for controlling said power means as the respective buckets move in succession through the remaining arc of rotation.

17. Excavating apparatus comprising a rotary structure, a plurality of bucket-carrying members carried thereby and arranged for movement inwardly and outwardly with respect to said structure, a bucket carried by each of said members, a cylinder having a double acting piston therein for actuating each of said members, a movable valve for directing the flow of fluid to either side of each piston for effecting the inward or outward movement of the respective bucket, a cam, a rod for each of said valves and operatively engaged by said cam for moving said valves to positions for effecting the disposition of said bucket at predetermined positions relatively to said structure during a certain arc of rotation thereof, said cam having an adjustable portion for controlling the movement of said buckets as the same move in succession through the remaining arc of rotation, and manually operable means for adjusting said movable cam portion.

18. Excavating apparatus comprising a rotary structure, a plurality of buckets carried thereby, individual mechanism for actuating each of said buckets outwardly and inwardly with respect to said structure during the rotation thereof, means for controlling the actuating mechanism of said buckets as the latter move through a predetermined arc of rotation within which excavation is effected, and means for automatically controlling said actuating mechanism for effecting the dumping of said buckets as the same move to a predetermined position within the remaining arc of rotation.

19. Excavating apparatus comprising a rotary structure, one or more excavating buckets carried thereby and arranged for movement inwardly and outwardly relative to said structure, means for manually controlling the outward and inward movements of said bucket or buckets within a given arc of rotation thereof, and means for automatically controlling the movements of the same during the remaining arc of rotation.

20. Excavating apparatus comprising a rotary structure, an extensible member carried thereby, an excavating bucket pivotally carried by said member for movement by the latter outwardly and inwardly with respect to the periphery of said structure, a second extensible member carried by said structure and operatively attached to said bucket for effecting pivotal movement thereof, means for actuating said extensible members, automatic means for controlling the actuation of said extensible members during a given arc of rotation of said structure, and manual means for controlling the actuation of said first mentioned extensible member during the remaining arc of rotation thereof.

21. Excavating apparatus comprising a rotary structure, an extensible thrust member pivoted at one end to said structure, an excavating bucket pivotally attached to the outer end of said member and being disposed beyond the periphery of said structure, and a link pivoted to said bucket and to said structure for resisting stresses imposed on said bucket and thrust member in a circumferential direction and cooperating with said thrust member to move the same pivotally in a direction for effecting the peripheral acceleration or deceleration of said bucket during the outward or inward movement respectively of the same by said thrust member.

22. Excavating apparatus comprising a rotary structure, a bucket thrust member carried by said structure and arranged for relative movement with respect to said structure in a direction the same as or opposite to the direction of rotary movement of the structure, an excavating bucket carried by said thrust member and means for effecting the movement of said thrust member and bucket in a direction relatively opposite to the direction of rotation of the structure for momentarily decelerating the peripheral speed of the bucket to facilitate the discharge of the contents thereof.

RAYMOND SAMUEL WEIMER.